United States Patent [19]

Baron

[11] Patent Number: 5,177,895
[45] Date of Patent: Jan. 12, 1993

[54] FISHING LURE
[76] Inventor: Richard D. Baron, 1308 Hawthorn St., Zephyrhills, Fla. 33540
[21] Appl. No.: 890,811
[22] Filed: Jun. 1, 1992
[51] Int. Cl.$^5$ ............................................. A01K 83/06
[52] U.S. Cl. ...................................... 43/44.2; 43/44.6
[58] Field of Search ...................... 43/44.2, 44.4, 44.6, 43/44.8

[56] References Cited
U.S. PATENT DOCUMENTS

| | | | |
|---|---|---|---|
| 2,467,971 | 4/1948 | Frair | 43/44.2 |
| 2,763,086 | 9/1956 | Johnson et al. | 43/44.2 |
| 4,067,135 | 1/1978 | Martin | 43/44.2 |
| 4,133,132 | 1/1979 | Ellis et al. | 43/44.4 |
| 4,848,023 | 7/1989 | Ryder et al. | 43/44.2 |
| 4,932,154 | 6/1990 | Andreetti | 43/44.6 |

Primary Examiner—Richard K. Seidel
Assistant Examiner—Chuck Y. Mah
Attorney, Agent, or Firm—Frijouf, Rust & Pyle

[57] ABSTRACT

An improved fishing lure is disclosed for attaching a bait to a fishing line comprising a lure head having a front aperture for enabling the fishing line to extend therethrough. The lure head has an insert cavity and a first side panel defining a locking aperture. A lure insert comprises an insert portion and a second side panel supporting a locking pin. The fishing line is restrained from movement relative to the lure insert whereas the locking pin extends through the bait for restraining the movement of the bait relative thereto. The lure insert is insertable within the insert cavity with the fishing line extending through the front aperture and with the locking aperture cooperating with the locking pin for interlocking the lure insert to the lure head and for retaining the bait between the first and second side panels.

14 Claims, 7 Drawing Sheets

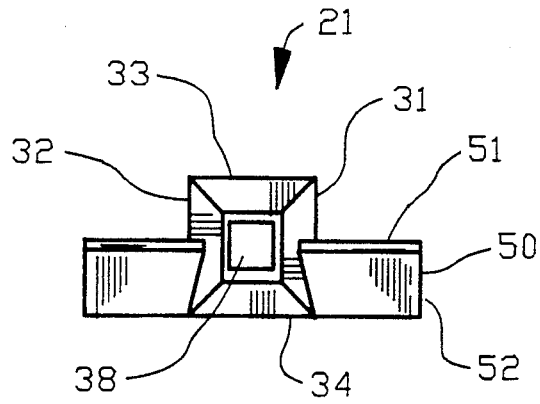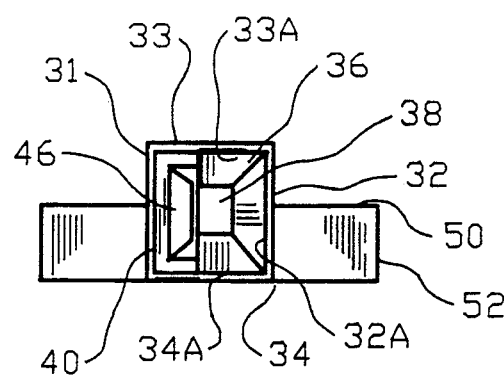
FIG. 4    FIG. 5
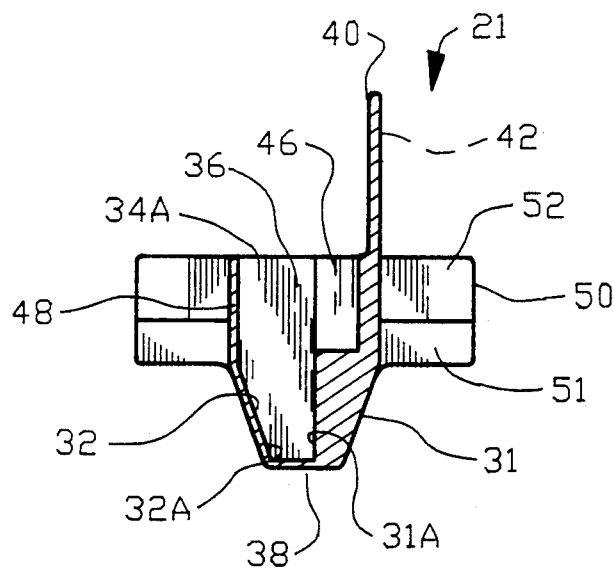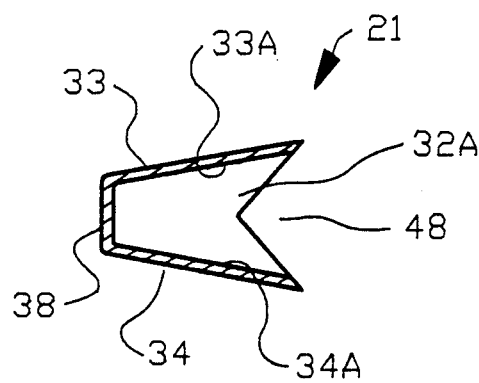
FIG. 6    FIG. 7
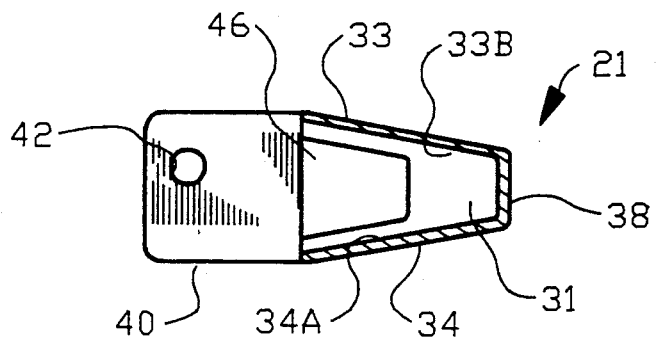
FIG. 8

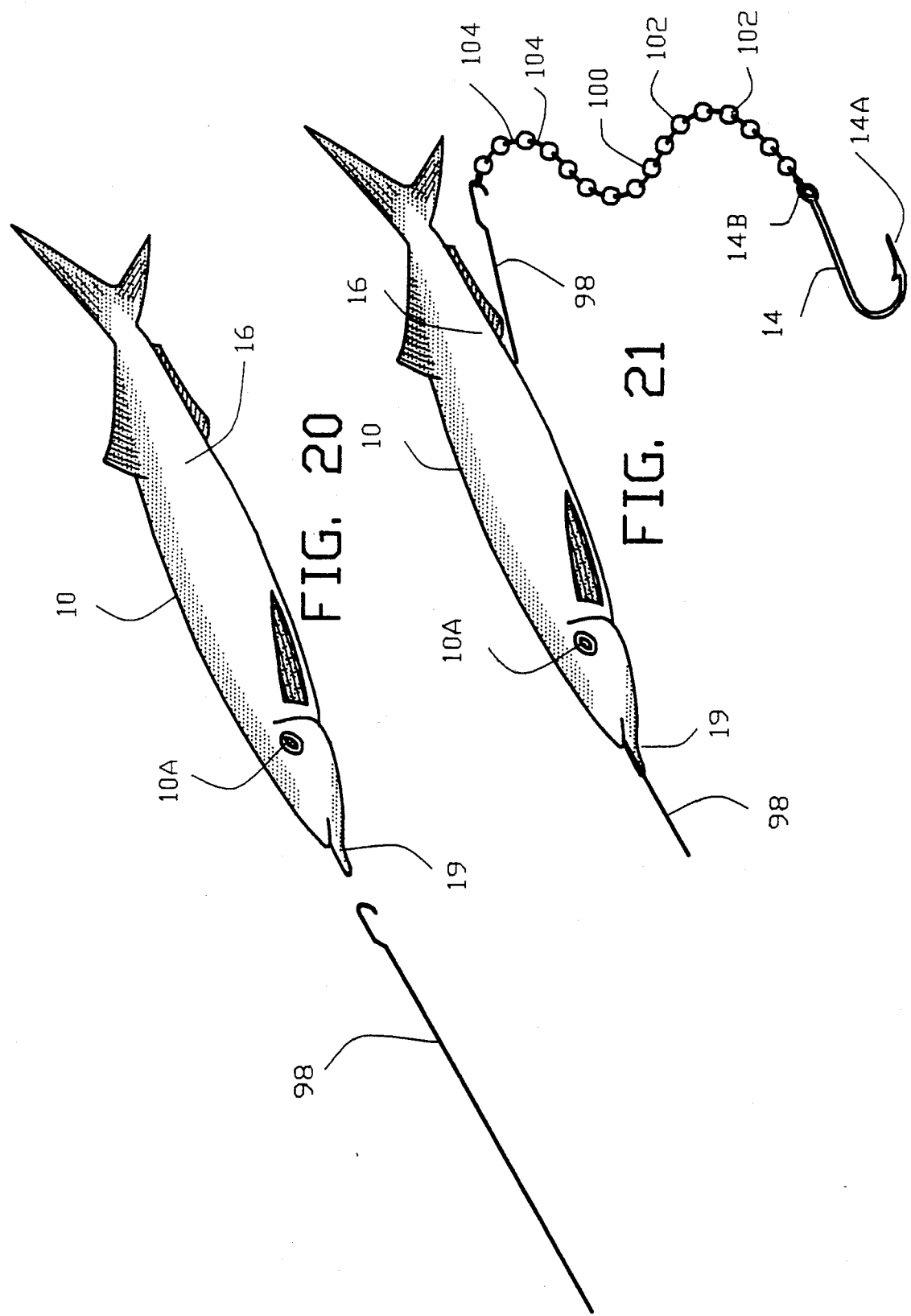

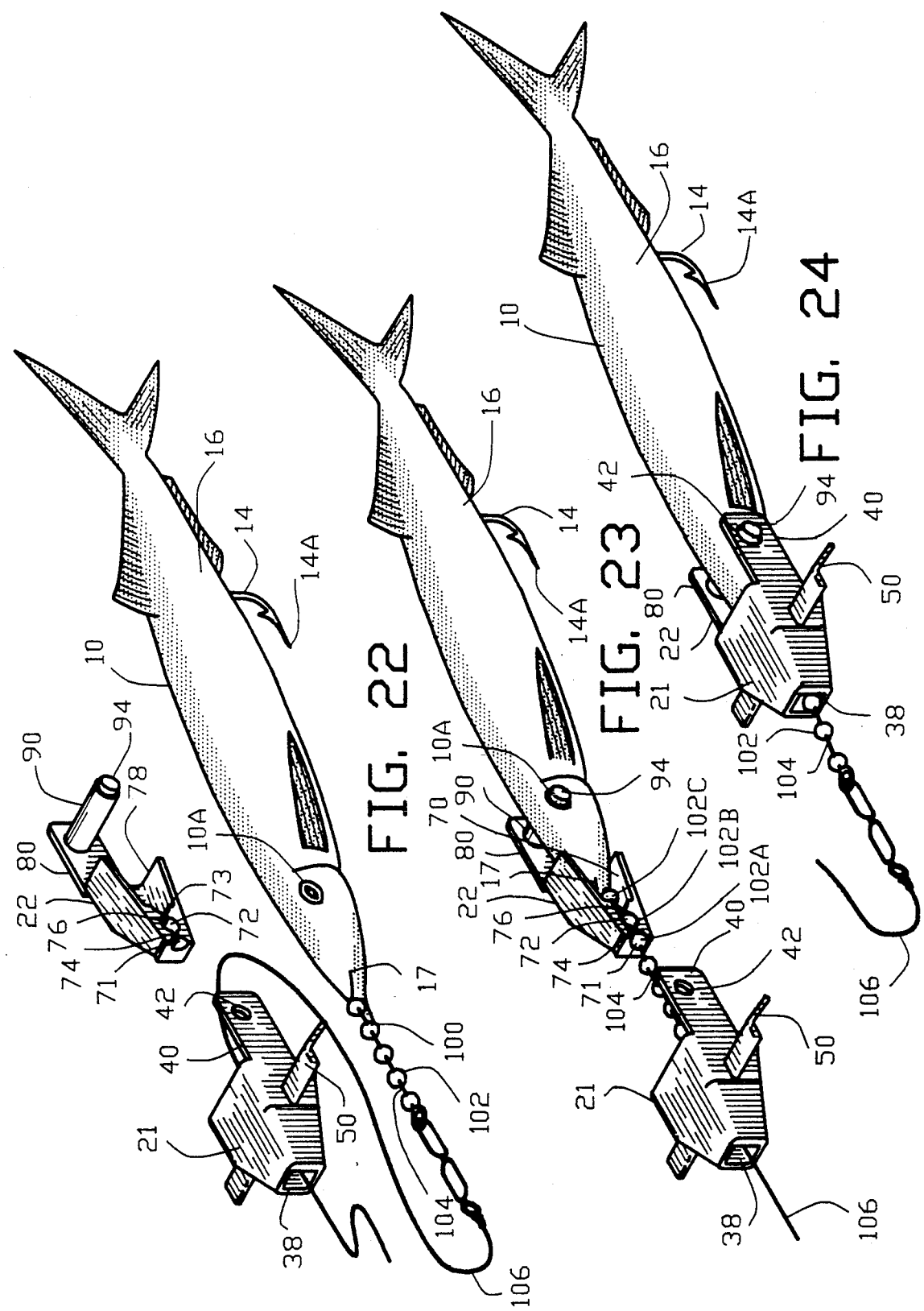

FISHING LURE

BACKGROUND OF THE INVENTION

1. Field of the Invention

This invention relates to fishing and more particularly to an improved fishing lure for use with natural or artificial bait.

2. Background of the Invention

Various types of fishing lures have been provided by the prior art to sports fishermen. In general, fishing lures may be classified as artificial bait fishing lures and natural bait fishing lures. In an artificial bait fishing lure, the fishing lure provides the total attraction for a fish and simulates the motion, action, sound and appearance of a natural bait. In a natural bait fishing lure, the fishing lure enhances the motion, action, sound and appearance of a natural bait. In the event that the natural bait is dead, the natural bait fishing lure again provides the motion, action and sound of the natural bait in a manner similar to the artificial bait fishing lure.

U.S. Pat. No. 2,017,333 to Zuck discloses a lure with live bait impaling means by which the bait is retained on the lure to permit casting or trolling.

U.S. Pat. No. 2,196,376 to Anderson discloses a means which may be manually gripped for easily inserting an impaling member into the bait, such as a minnow or other small fish.

U.S. Pat. No. 2,848,836 to Dodd discloses a bait harness that is adapted to facilitate connection and disconnection of the bait to a harness.

U.S. Pat. No. 3,415,004 to Whalen discloses a live bait harness having a band embracing the body of the live bait comprising two one-piece wire mechanisms one of which is fastened to a band and the other of which is a spreader mechanism for holding a pair of fishhooks spaced apart on opposite sides of the live bait.

U.S. Pat. No. 3,645,031 to Egles discloses a trolling rig for bait fishing having a substantially frustoconical-shaped cap to receive the head of the bait fish. A fish locking pin extends through the openings and the head of the fish for securing the fish to the cap.

U.S. Pat. No. 4,067,135 to Martin discloses a fishing lure adapted to hold live, dead and artificial bait and includes a cup having an open end and a closed end for holding a first portion of a bait therein. Anchors extend from the open end of the cup into a portion of the bait.

U.S. Pat. No. 4,133,132 to Ellis et al discloses a protector for covering the front face of a "plug-cut herring" to maintain the front face of the plug at a predetermined angle. The protector is a cap having a planar face and a cylindrical wall adapted to extend rearwardly along the sides of the herring when the inside surface of the cap member abuts the front face of the herring.

U.S. Pat. No. 4,233,771 to Robinson discloses a bait holder for holding minnow-type bait having a ring within which the head of the bait has a wedged fit and which is held in position by engagement of a pair of hooks at free ends of a pair of parallel arms extending aft from the ring.

U.S. Pat. No. 4,791,751 to Francklyn discloses an adjustable bait-receiving fishing lure for use in receiving baits. The bait-receiving lure includes a top section and bottom section that cooperatively engage the upper and lower forward portions of a bait.

U.S. Pat. No. 4,848,023 to Ryder et al discloses a fishing lure for use with dead bait fish including a cover having a cavity having projecting barbs for insertion of the head of the bait fish. The cover can be opened to received the head of the bait fish and can be closed to anchor the fish head within the articulated cover.

U.S. Pat. No. 4,932,154 to Andreetti discloses a trolling rig intended for use with ballyhoo. The trolling rig has a conical cap that resembles the head of a ballyhoo with a leader being attached to the leading edge of the cap. A second leader is attached to a rear lower edge of the conical cap and a hook is connected thereto.

Therefore, it is an object of the present invention to provide an improved fishing lure for attaching a bait to a fishing line that overcomes the difficulties encountered by the prior art.

Another object of this invention is to provide an improved fishing lure for attaching a bait to a fishing line that may be used with natural or artificial bait.

Another object of this invention is to provide an improved fishing lure for attaching a bait to a fishing line wherein a locking pin extends through an eye socket of a natural bait or extends through an orifice in an artificial bait.

Another object of this invention is to provide an improved fishing lure for attaching a bait to a fishing line that permits the rapid addition of bait or the rapid removal of bait from the fishing lure.

Another object of this invention is to provide an improved fishing lure for attaching a bait to a fishing line that may be specifically adapted for ballyhoo bait or the like.

Another object of this invention is to provide an improved fishing lure for attaching of a bait to a fishing line that permits the adjusting the position of a hook disposed at a termination end of the fishing line relative to the bait.

Another object of this invention is to provide an improved fishing lure for attaching a bait to a fishing line including fin means for stabilizing the movement of the fish lure through the water without undesirable spinning.

Another object of this invention is to provide an improved fishing lure for attaching a bait to a fishing line that is substantially weedless.

Another object of this invention is to provide an improved fishing lure for attaching a bait to a fishing line that increases the action of the bait as well as the visibility of the bait within the water.

Another object of this invention is to provide an improved fishing lure for attaching a bait to a fishing line which essentially eliminates the degradation of natural bait due to trolling water entering the mouth of the fish commonly referred to as "bait washout."

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved fishing lure for attaching a bait to a fishing line, comprising a lure head having a front aperture for enabling the fishing line to extend therethrough. The lure head has an insert cavity communicating with the front aperture and with a first side panel extending rearwardly of the lure head with the first side panel defining a locking aperture. A lure insert comprises an insert portion and a second side panel extending rearwardly of the insert portion with the second side panel supporting a locking pin. A restraining means is secured to the lure insert for restraining the movement of the fishing line relative thereto. The locking pin extends through the bait for restraining the movement of the bait relative thereto. The lure insert is insertable within the insert cavity of the lure head with the fishing line extending through the front aperture of the lure head and with the locking aperture of the first panel cooperating with the locking pin of the second panel for interlocking the lure insert to the lure head and for retaining the bait between the first and second side panels.

In one embodiment of the invention, the lure head includes fins means extending from the lure head for stabilizing the movement of the fish lure through the water with the lure head having a tapered front portion disposed about the front aperture for facilitating the movement of the fish lure through the water.

Preferably, the insert cavity is defined for slidably receiving the insert portion of the lure insert therein. The first side panel extends from a first side surface of the lure head whereas the second side panel is aligned with a second side surface of the lure head. The locking pin extends from the second side panel through the bait and is partially received within the locking aperture for restraining the movement of the bait relative thereto. The first and second side panels may be resilient for enabling the introduction and removal of the locking pin within the locking aperture to permit the addition and removal of the bait from the fishing lure.

In one embodiment of the invention, the locking pin extends through an eye socket of a natural bait or extends through an orifice in an artificial bait. Optional eye indicia may be disposed about the locking aperture and proximate the locking pin for simulating the eyes of the bait. A rear void may be provided in one of the lure head and the lure insert for receiving a head portion of the bait.

The restraining means comprises means for adjusting the position of a hook disposed at a termination end of the fishing line relative to the bait. In one embodiment of the invention, a slot extends through the lure insert for enabling the fishing line to extend therethrough with the fishing line being restricted for movement within the slot.

In a specific example of the invention, the fishing line comprises a beaded fishing line with a plurality of bead apertures defined in the lure insert along the slot for receiving the plurality of beads therein to restrict the movement of the fishing line relative to the slot.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 4 is a front elevational view of the lure head of FIG. 3;

FIG. 5 is a rear elevational view of the lure head of FIG. 3;

FIG. 6 is a sectional view along line 6—6 in FIG. 4;

FIG. 7 is a sectional view along line 7—7 in FIG. 4;

FIG. 8 is a sectional view along line 8—8 in FIG. 4;

FIG. 20 is a first step of securing the improved fishing lure of FIGS. 3–13 to a bait fish illustrating the insertion of a retrieving catch through the bait fish;

FIG. 21 is a second step of securing the improved fishing lure of FIGS. 3–13 to the bait fish illustrating the coupling of the retrieving catch with a bead leader having a fishing hook;

FIG. 22 is a third step of securing the improved fishing lure of FIGS. 3–13 to the bait fish illustrating the drawing of the bead leader through the bait fish and the passing of the bead leader through a front aperture in the improved fishing lure;

FIG. 23 is a fourth step of securing the improved fishing lure of FIGS. 3–13 to the bait fish illustrating the impaling of the bait fish by the improved fishing lure; and FIG. 24 is a fifth step of securing the improved fishing lure of FIGS. 3–13 to the bait fish illustrating the assembly of the improved fishing lure for affixing of the improved fishing lure to the bead leader.

Similar reference characters refer to similar parts throughout the several Figures of the drawings.

DETAILED DISCUSSION

Figure 1:
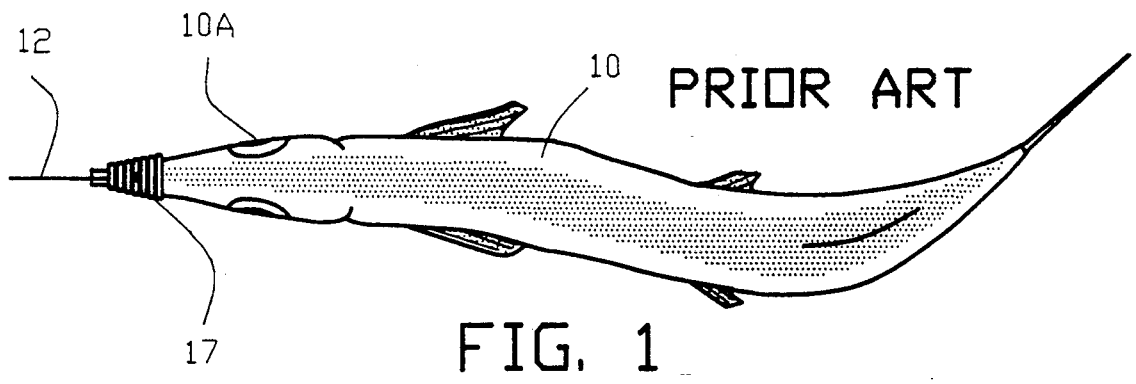
FIG. 1 is a top view of a bait fish secured to a conventional wire leader using a prior art system.
Figure 2:
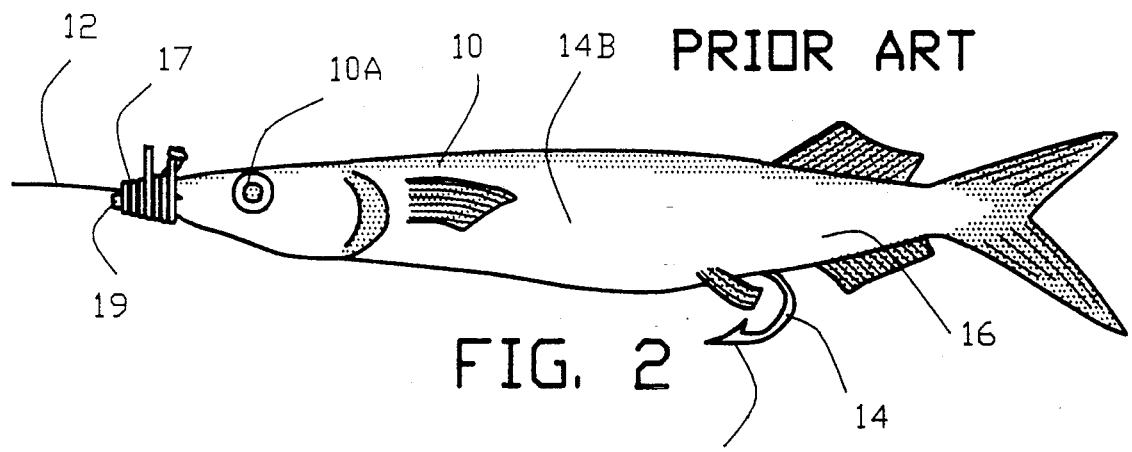
FIG. 2 is a side view of FIG. 1.

FIGS. 1 and 2 illustrate top and side views of a bait fish 10 secured to a conventional wire leader 12 using a prior art system. In this example, the bait fish 10 is shown as a ballyhoo or balao weighing between one-quarter pound and one-half pound. This prior art system is widely used for securing the ballyhoo or other bait fish 10 to the wire leader 12 for trolling for smaller predator fish as well as large game fish such as marlin, sailfish and the like.

FIGS. 1 and 2 illustrate a fishing hook 14 inserted through the bait fish 10 with a point 14A of the fishing hook 14 extending from a posterior portion 16 of the bait fish 10. An eye 14B (not shown) of the fishing hook 14 is connected to the wire leader 12. A securing wire 17 is fastened to the eye 14B (not shown) of the fishing hook 14 and is wrapped around the bait fish 10 for securing the bait fish 10 to the wire leader 12.

Although the prior art system shown in FIGS. 1 and 2 is widely used for trolling bait fish 10, the prior art has developed other varied methods of securing a bait fish 10 to a wire leader 12. Examples of the other different and distinct methods for securing the bait fish 10 to the wire leader 12 are disclosed in numerous fishing publications.

Figure 3:
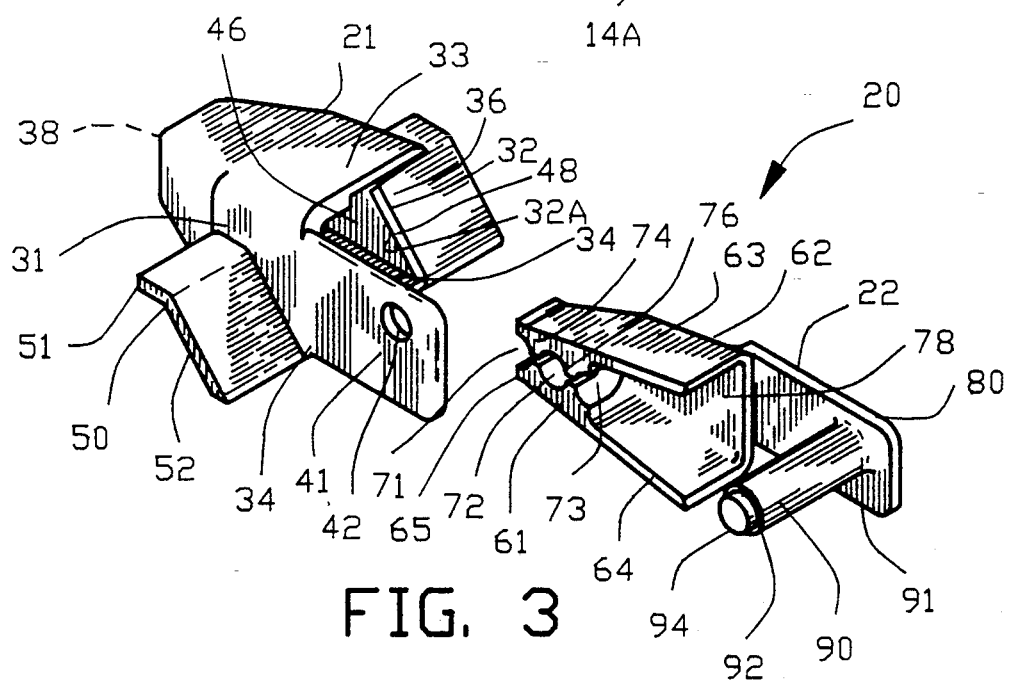
FIG. 3 is an isometric view of a first embodiment of an improved fishing lure comprising a lure head and a lure insert incorporating the present invention.
Figure 9:
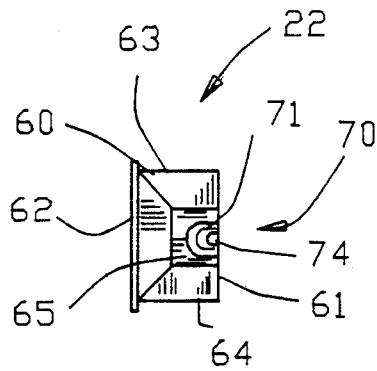
FIG. 9 is a front elevational view of the lure insert of FIG. 3.
Figure 10:
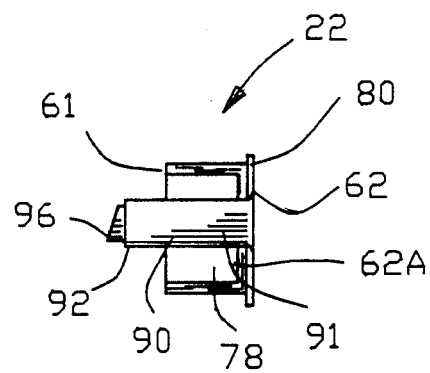
FIG. 10 is a rear elevational view of the lure insert of FIG. 3.
Figure 11:
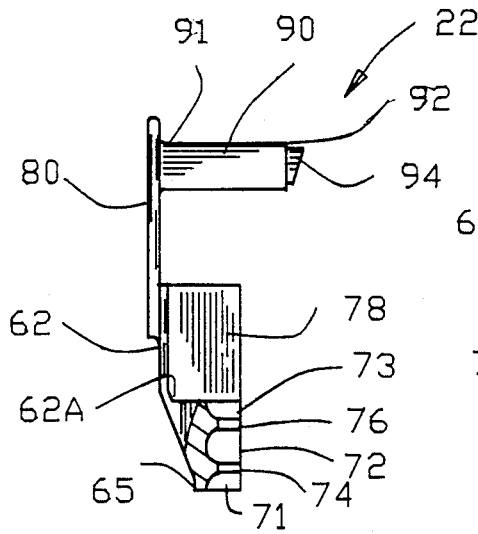
FIG. 11 is a top view partially in section of FIG. 9.
Figure 12:
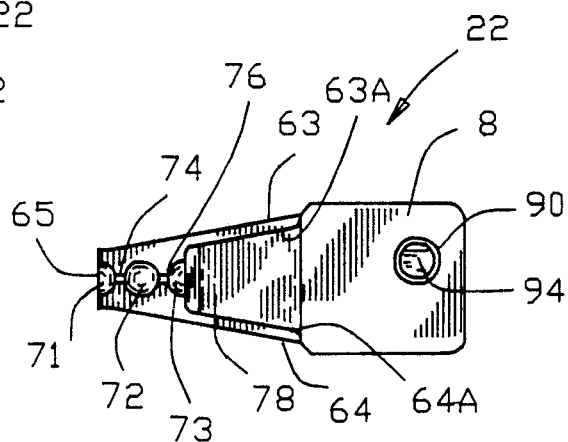
FIG. 12 is a right side view of FIG. 9.
Figure 13:
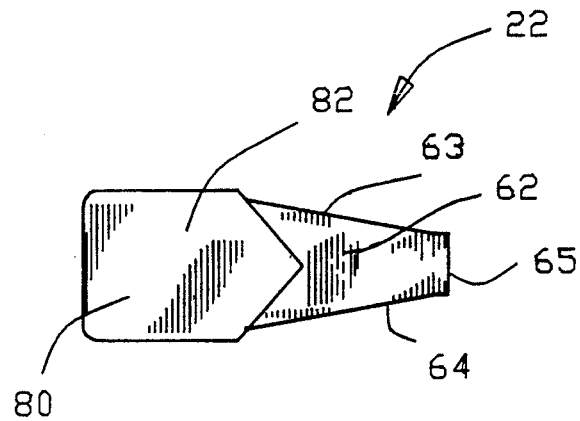
FIG. 13 is a left side view of FIG. 9.

FIG. 3 is an isometric disassembled view of a first embodiment of an improved fishing lure 20 having a lure head 21 and a lure insert 22. FIGS. 4-8 illustrate various views of the lure head 21. The lure head 21 comprises a generally truncated pyramidal shape defined by a first and a second head sidewall 31 and 32 and a top head wall 33 and a bottom head wall 34. The generally truncated pyramidal shape provides a tapered front portion for facilitating the movement of the improved fish lure 20 through the water. The first and second head sidewalls 32 and the top and bottom head walls 33 and 34 have first and second head interior surfaces 31A and 32A and top and bottom head interior surfaces 33A and 34A defining an insert cavity 36 within the lure head 21. A front aperture 38 in the lure head 21 communicates with the insert cavity 36.

The first head sidewall 31 includes a rearwardly extending first panel 40 having a locking aperture 42 defined therein. An optional first eye indicia (not shown) may be disposed about the locking aperture 42 for simulating an eye of the bait fish 10. The first head sidewall 31 is substantially thicker than the second head sidewall 32 and the top and bottom head walls 33 and 34. A generally U-shape head relief 46 is defined in the first head sidewall 31 whereas a generally V-shaped cut-out 48 is defined in the second head sidewall 32.

Preferably, the lure head 21 includes a stabilizing fin 50 having a front fin portion 51 and a rear fin portion 52. The front fin portion 51 is established to be substantially horizontal to the direction of movement of the lure head 21 when the lure head 21 is pulled through the water. The rear fin portion 52 is angled downwardly for providing stabilization to the improved fishing lure 20 during trolling.

FIGS. 9-13 illustrate various views of the lure insert 22. The lure insert 22 comprises a partially pyramidal shaped insert portion 60 having a first and a second insert sidewall 61 and 62 and a top insert wall 63 and a bottom insert wall 64. The first and second insert sidewall 62 and the top and bottom insert walls 63 and 64 are established at an angle for closely engaging the first and second head sidewalls 31 and 32 and the top and bottom head walls 33 and 34, respectively, of the lure head 21 when the lure insert 22 is fully disposed within the insert cavity 36. The first insert sidewall 61 includes an insert slot 70 extending from a front insert wall 65 of the lure insert 22 to an insert relief 78 defined in the first insert sidewall 61. A plurality of depressions including a first, second and a third depression 71-73 are intermittently defined in the first insert sidewall 61 with a first separating wall 74 interposed between the first and the second depressions 71 and 72 and with a second separating wall 76 interposed between the second and the third depressions 72 and 73. The first, second and the third depressions 71-73 and the first and second separating walls 74 and 76 comprise a restraining means for restraining the movement of a leader relative to the improved fishing lure 20 as will be described in greater detail hereinafter.

The second insert sidewall 62 comprises a second panel 80 having a generally V-shaped projection 82 for matingly engaging with the V-shaped cut-out 48 of the second head sidewall 32 when the lure insert 22 is disposed within the lure head 21. A locking pin 90 having a proximal and distal end 92 has the proximal end 91 thereof secured to the second panel 80. The distal end 92 of the locking pin 90 includes a locking portion 94 having a reduced diameter for insertion within the locking aperture 42 of the first panel 40 when the lure insert 22 is disposed within the lure head 21. An optional second eye indicia (not shown) may be disposed about the locking pin 90 for simulating an eye of the bait fish 10.

Preferably, the lure head 21 and the lure insert 22 are each formed as a unitary member of a molded polymeric material. The first and second panels 40 and 80 are slightly flexible for enabling the locking portion 94 to be inserted and removed from the locking aperture 42 by deflecting either the first and/or the second panels 40 and 80.

Figure 14:
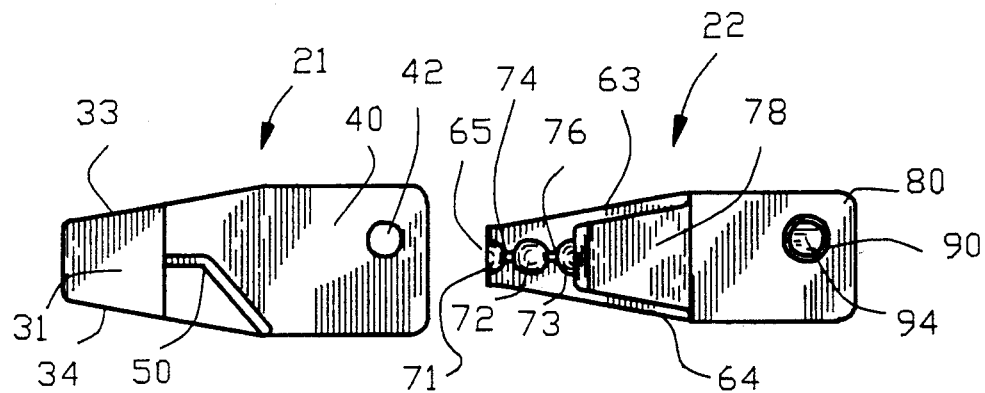
FIG. 14 is a side elevational of the improved fishing lure of FIG. 3 with the improved fishing lure being in an unassembled condition.
Figure 15:
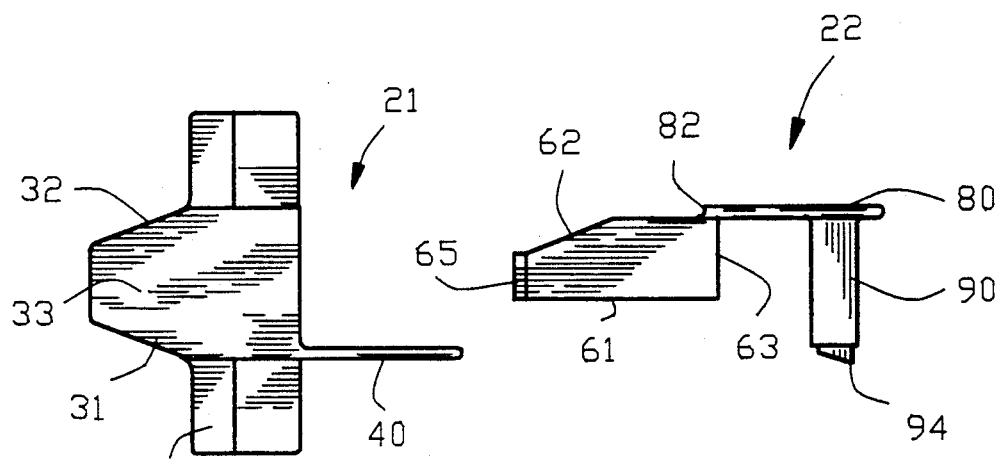
FIG. 15 is a top view of FIG. 14.

FIG. 14 is a side view of the lure head 21 and the lure insert 22 being in an unassembled position. FIG. 5 is a top view of FIG. 14 illustrating the relative positions of the first and second panels 40 and 80 and the locking pin 90.

Figure 16:
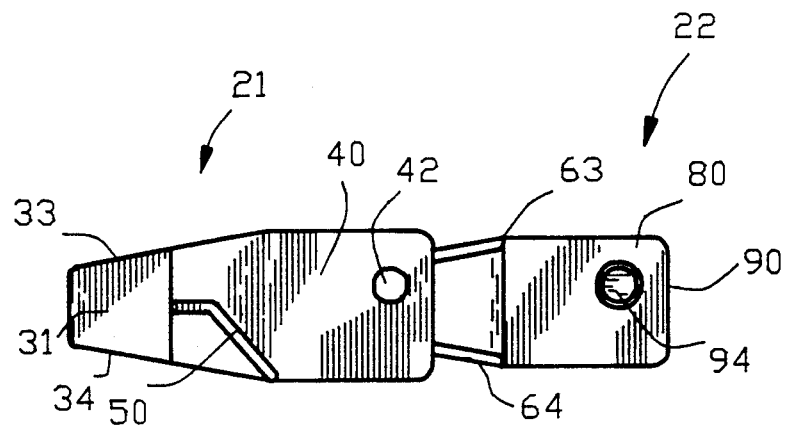
FIG. 16 is a side elevational similar to FIG. 14 with the improved fishing lure being in a partially assembled condition.
Figure 17:
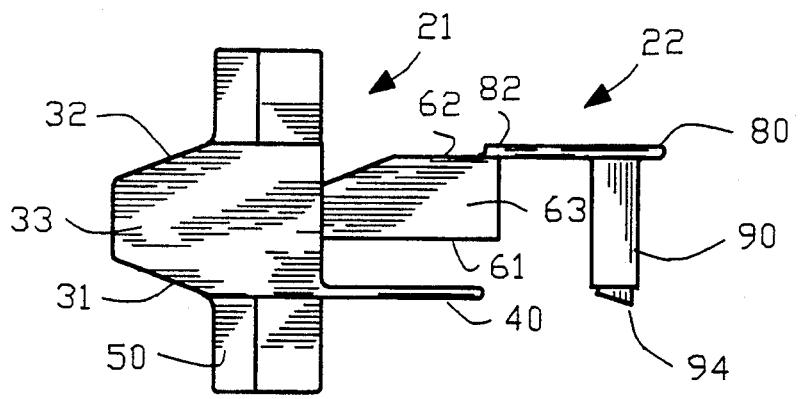
FIG. 17 is a top view of FIG. 16.

FIG. 16 is a side view similar to FIG. 14 illustrating the lure insert 22 being partially disposed within the internal cavity of the lure head 21. FIG. 17 is a top view of FIG. 16. The insert portion 60 of the lure insert 22 is slidably received within the insert cavity 36 of the lure head 21.

Figure 18:
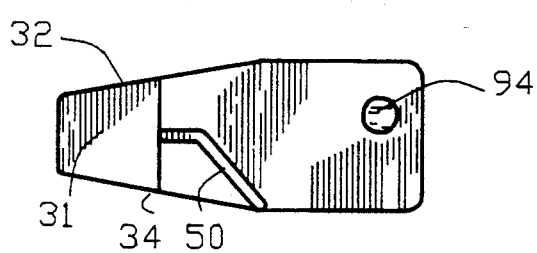
FIG. 18 is a side elevational view similar to FIG. 14 with the improved fishing lure being in an assembled condition.
Figure 19:
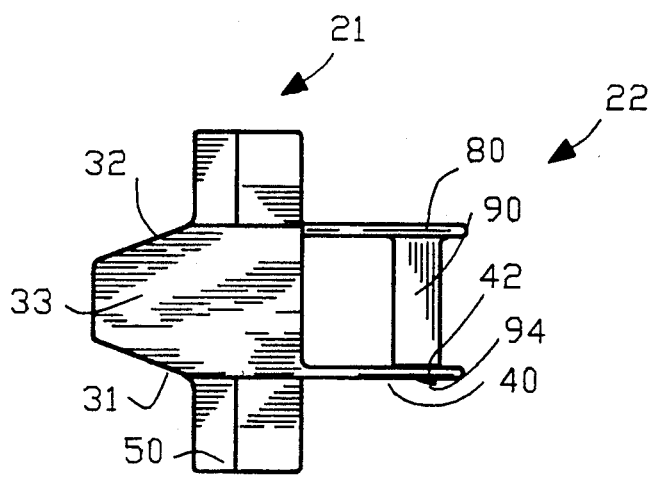
FIG. 19 is a top view of FIG. 18.

FIG. 18 is a side view similar to FIG. 14 illustrating the complete insertion of the lure insert 22 within the lure head 21 and with the lock portion of the locking pin 90 being received within the locking aperture 42 of the first panel 40. FIG. 19 is a top view of FIG. 18. Engagement of the locking portion 94 within the locking aperture 42 of the first panel 40 interlocks the lure insert 22 within the lure head 21. It should be appreciated by those skilled in the art that the insertion of the locking portion 94 within the locking aperture 42 of the first panel 40 has been accomplished by an outward deflection of FIG. 19 of either the first and/or the second panel 40 and 80.

FIG. 20 illustrates a first step of securing the improved fishing lure 20 to the bait fish 10. A retrieving catch 98 is inserted into the mouth of the bait fish 10 and forced through the bait fish 10 to exit from the posterior portion 16.

FIG. 21 illustrates a second step of securing the improved fishing lure 20 to the bait fish 10 wherein the retrieving catch 98 is coupled to a bead leader 100 having a fishing hook 14. The bead leader 100 is of conventional design having a plurality of beads 102 interconnected by a plurality of interconnecting wires 104.

FIG. 22 illustrates a third step of securing the improved fishing lure 20 to the bait fish 10. The bead leader 100 is drawn through the bait fish 10 by withdrawing the retrieving catch 98. The retrieving catch 98 is withdrawn from the bait fish 10 to position the point 14A of the hook 14 in the desired location. A fishing line 106 is passed through the front aperture 38 of the lure head 21 and is secured to the bead leader 100. In the alternative, the hook 14 may be rotated one hundred and eighty degrees in FIG. 22 such that the point 14A of the hook 14 is embedded in the bait fish 10. When the hook 14 is embedded in the bait fish 10, the bait is substantially weedless.

FIG. 23 illustrates a fourth step of securing the improved fishing lure 20 to the bait fish 10. The locking pin 90 is impaled through an eye socket 10A of one side of the bait fish 10 and is passed through the opposed eye socket 10A on the other side of the bait fish 10 to extend therefrom. It should be appreciated by those skilled in the art that the eye sockets 10A of the bait fish 10 is surrounded by a skeleton structure. The locking pin 90 impaled through the eye sockets 10A of the bait fish 10 is disposed within this skeleton structure for providing an effective attachment of the improved fishing lure 20 to the bait fish 10. The locking portion 94 is smaller in diameter than the locking pin 90 and approximates a point for the locking pin 90 to facilitate the impaling of the locking pin 90 through the eye socket 10A of the bait fish 10.

FIG. 23 further illustrates selected beads 102 of the bead leader 100 being inserted into the first, second and third depressions 71-73. The interconnecting wires 104 extend through the first and second separating walls 74 and 76 to attach the bead leader 100 relative to the lure insert 22. The first and second separating walls 74 and 76 insure that the position of the bead leader 100 is fixed relative to the lure insert 22. In addition, the proper selection of the beads 102 inserted into the first, second and third depressions 71-73 enables the proper positioning of the fishing hook 14 relative to the lure insert 22 and relative to the bait fish 10. Preferably, the locking pin 90 is located on the second extending wall to position the bill 19 of the bait fish 10 within the insert relief 78 as shown in FIG. 23.

FIG. 24 illustrates a fourth step of securing the improved fishing lure 20 to the bait fish 10. The lure insert 22 is moved into the insert cavity 36. The bill 19 of the bait fish 10 is received within the head relief 46. Since the bill 19 of the bait fish 10 is received within the head relief 46, the degradation of natural bait due to trolling water entering the mouth of the fish commonly referred to as "bait washout" is essentially eliminated. The first head interior surface 31A of the first head sidewall engages the first insert sidewall 61 to retain the selected beads 102 of the bead leader 100 within the first, second and third depressions 71-73. The first panel 40 is deflected outwardly by an operator as indicated by the arrow for enabling the locking portion 94 of the locking pin 90 to be aligned with the locking aperture 42. Upon release of the deflection of the first panel 40 by the operator, the first panel 40 returns to a non-deflected position to receive the locking portion 94 within the locking aperture 42 as shown in FIG. 24. The locking portion 94 disposed within the locking aperture 42 prevents the removal of the lure insert 22 from the lure head 21. The bait fish 10 is retained between the first and second panels 40 and 80.

The present invention provides an improved fishing lure for attaching a bait to a fishing line that overcomes the difficulties encountered by the prior art. The improved fishing lure may be used with natural bait with the locking pin extending through the eye sockets of a bait fish or may be used with artificial bait with the locking pin extending through a hole in the artificial bait.

The improved fishing lure permits the rapid addition of bait or the rapid removal of bait from the fishing lure and permits the adjustment of the position of the hook relative to the bait. Stabilizing fins may be utilized for stabilizing the movement of the fishing lure through the water without undersirable spinning. The generally truncated pyramidal shape provides a tapered front portion for facilitating the movement of the improved fishing lure through the water and makes the improved fishing lure substantially weedless.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved fishing lure for attaching a bait to a fishing line, comprising in combination:
   a lure head having a front aperture for enabling the fishing line to extend therethrough;
   said lure head having an insert cavity communicating with said front aperture;
   said lure head having a first side panel extending rearwardly of said lure head with said first side panel defining a locking aperture;
   a lure insert comprising an insert portion and a second side panel extending rearwardly of said insert portion with said second side panel supporting a locking pin;
   restraining means secured to said lure insert for restraining the movement of the fishing line relative thereto;
   said locking pin extending through the bait for restraining the movement of the bait relative thereto; and
   said lure insert being insertable within said insert cavity of said lure head with the fishing line extending through said front aperture of said lure head and with said locking aperture of said first side panel cooperating with said locking pin of said second side panel for interlocking said lure insert to said lure head and for retaining the bait between said first and second side panels.

2. An improved fishing lure as set forth in claim 1, including fin means extending from said lure head for stabilizing the movement of the fish lure through the water.

3. An improved fishing lure as set forth in claim 1, wherein said lure head comprises a tapered front portion disposed about said front aperture for facilitating the movement of the fishing lure through the water.

4. An improved fishing lure as set forth in claim 1, wherein said insert cavity is defined for slidably receiving said insert portion of said lure insert therein.

5. An improved fishing lure as set forth in claim 1, wherein said first side panel extends from a first side surface of said lure head.

6. An improved fishing lure as set forth in claim 1, wherein said second side panel is aligned with a second side surface of said lure head.

7. An improved fishing lure as set forth in claim 1, including at least one of said lure head and said lure insert defining a relief for receiving a head portion of the bait.

8. An improved fishing lure as set forth in claim 1, wherein said restraining means comprises means for adjusting the position of a hook disposed at a termination end of the fishing line relative to the bait.

9. An improved fishing lure as set forth in claim 1, wherein said restraining means includes a slot extending through said lure insert for enabling the fishing line to extend therethrough; and
   means for restricting the movement of the fishing line relative to said slot.

10. An improved fishing lure as set forth in claim 1, wherein the fishing line includes a bead leader comprising a plurality of beads interconnected by a plurality of interconnecting wires;
    said restraining means includes a slot extending through said lure insert for enabling the interconnecting wires to extend therethrough; and
    a plurality of depressions defined in said lure insert along said slot for receiving said plurality of beads therein to restrict the movement of said bead leader relative to said slot.

11. An improved fishing lure as set forth in claim 1, wherein said first side panel extends from a first side surface of said lure head;
    said second side panel being aligned with a second side surface of said lure head; and
    said locking pin extending from said second side panel through the bait and being partially received within said locking aperture for restraining the movement of the bait relative thereto.

12. An improved fishing lure as set forth in claim 1, wherein said first side panel extends from a first side surface of said lure head;
    said second side panel being aligned with a second side surface of said lure head; and
    said locking pin extending from said second side panel through an eye socket of a natural bait and being partially received within said locking aperture for restraining the movement of the bait relative thereto.

13. An improved fishing lure as set forth in claim 1, wherein said first side panel extends from a first side surface of said lure head;
    said second side panel being aligned with a second side surface of said lure head; and
    said locking pin extending from said second side panel through an orifice in an artificial bait and being partially received within said locking aperture for restraining the movement of the bait relative thereto.

14. An improved fishing lure as set forth in claim 1, wherein said first side panel extends from a first side surface of said lure head;
    said second side panel being aligned with a second side surface of said lure head;
    said locking pin extending from said second side panel through the bait and being partially received within said locking aperture for restraining the movement of the bait relative thereto; and
    said first and second side panels being resilient for enabling the introduction and removal of said locking pin within said locking aperture to permit the addition and removal of the bait from the fishing lure.

* * * * *